(12) United States Patent
Hsueh et al.

(10) Patent No.: US 10,574,176 B2
(45) Date of Patent: Feb. 25, 2020

(54) WATERPROOF CONNECTING STRUCTURE

(71) Applicant: Lien-Feng Hsueh, Tainan (TW)

(72) Inventors: Lien-Feng Hsueh, Tainan (TW); Min-Lang Wang, Tainan (TW)

(73) Assignee: Lien-Feng Hsueh, Tainan (TW)

( * ) Notice: Subject to any disclaimer, the term of this patent is extended or adjusted under 35 U.S.C. 154(b) by 0 days.

(21) Appl. No.: 15/980,017

(22) Filed: May 15, 2018

(65) Prior Publication Data
US 2018/0262157 A1    Sep. 13, 2018

Related U.S. Application Data

(63) Continuation-in-part of application No. 14/816,552, filed on Aug. 3, 2015, now abandoned.

(30) Foreign Application Priority Data

Nov. 11, 2014 (TW) .............................. 103139018 A

(51) Int. Cl.
*H02S 20/23* (2014.01)
*E04D 3/08* (2006.01)
*E04D 13/04* (2006.01)
*H02S 30/10* (2014.01)
*E04D 13/15* (2006.01)
(Continued)

(52) U.S. Cl.
CPC ................ *H02S 20/23* (2014.12); *E04D 3/08* (2013.01); *E04D 11/005* (2013.01); *E04D 13/04* (2013.01); *E04D 13/15* (2013.01); *H02S 20/25* (2014.12); *H02S 30/10* (2014.12); *E04D 2013/045* (2013.01); *Y02B 10/12* (2013.01)

(58) Field of Classification Search
CPC .......... H02S 20/22; H02S 20/25; H02S 20/23; H02S 20/24; H02S 30/10; E04D 2013/0413; E04D 2013/0422; E04D 2013/0431; E04D 2013/0463; E04D 2013/0468; E04D 13/04; E04D 13/0404; E04D 13/0409; E04D 13/0445; E04D 13/0477; E04D 13/0459; E04D 11/005; E04D 3/08
See application file for complete search history.

(56) References Cited

U.S. PATENT DOCUMENTS

| 1,812,009 A | 6/1931 | Lenke |
| 3,443,350 A | 5/1969 | Birum, Jr. |
| 4,114,595 A | 9/1978 | Barker |

(Continued)

FOREIGN PATENT DOCUMENTS

| TW | M464492 U | 11/2013 |
| TW | M466143 U | 11/2013 |

*Primary Examiner* — Jessica L Laux
(74) *Attorney, Agent, or Firm* — Muncy, Geissler, Olds & Lowe, P.C.

(57) ABSTRACT

A waterproof connecting structure is used in coordination with a solar panel array in order to construct a vertical wall or a rooftop panel of a building. The waterproof connecting structure comprises two half components and a connecting component. The two half components are disposed between the two solar panels. The connecting component covers a joint between the two half components so that rainwater flowed into a conduit passage formed by each of the half components is guided out. Thereby, the rainwater is prevented from infiltrating into a building.

4 Claims, 10 Drawing Sheets

(51) Int. Cl.
*E04D 11/00* (2006.01)
*H02S 20/25* (2014.01)

(56) References Cited

U.S. PATENT DOCUMENTS

| | | | |
|---|---|---|---|
| 5,163,257 A | | 11/1992 | Crowell |
| 5,571,338 A | | 11/1996 | Kadonome et al. |
| 6,105,317 A | * | 8/2000 | Tomiuchi .................. E04D 3/08 52/173.3 |
| 6,672,018 B2 | | 1/2004 | Shingleton |
| 7,592,537 B1 | * | 9/2009 | West ....................... H02S 20/00 136/251 |
| 8,181,402 B2 | * | 5/2012 | Tsuzuki .................. F24S 20/67 52/173.3 |
| 9,745,754 B1 | * | 8/2017 | Narita ..................... E04D 13/10 |
| 2003/0094193 A1 | | 5/2003 | Mapes et al. |
| 2010/0276558 A1 | | 11/2010 | Faust et al. |
| 2013/0340358 A1 | * | 12/2013 | Danning ................. B23P 11/00 52/126.7 |
| 2016/0043686 A1 | * | 2/2016 | Hsueh .................... H02S 20/23 52/60 |
| 2016/0226434 A1 | * | 8/2016 | Tomlinson .............. H02S 20/23 |

\* cited by examiner

WATERPROOF CONNECTING STRUCTURE

CROSS REFERENCE TO RELATED APPLICATIONS

This application is a Continuation-in-Part of co-pending application Ser. No. 14/816,552, filed on Aug. 3, 2015, for which priority is claimed under 35 U.S.C. § 120; and this application claims priority of Application No. 103139018 filed in Taiwan on Nov. 11, 2014 under 35 U.S.C. § 119; the entire contents of all of which are hereby incorporated by reference.

FIELD OF THE INVENTION

The present invention relates to a waterproof connecting structure and more particularly to a waterproof connecting structure for assembling a plurality of solar panels.

BACKGROUND OF THE INVENTION

In the recent years, the awareness of environmental protection in the international community has raised gradually. How to rationally make use of green energy has become an important environmental issue. In green energy technologies, electric power generation with solar energy has received a lot of attention because the costs are low and the construction is simple and convenient. Solar panels of commonly used solar energy equipment are installed in unused areas on the top floor of buildings for converting light energy into electrical energy, and the energy is stored to substitute grid electricity. More specifically, conventional ways for installing solar panels is done by setting up grids on a top floor, and gratings are formed on top of the grids. Then, solar panels are embedded into the gratings on the grids. When it rains, rainwater will infiltrate into the building through gaps between the solar panels and the grids. The grids will oxidize and rust over time. For maintenance, the original grids are taken down for replacement. It is labor-consuming, time-consuming and wastes building materials.

The Taiwan Patent No. M466143 provides a solar energy roof tile that comprises a tile body and a solar panel. Two ends of the tile body are disposed with a coordinating portion respectively. By means of the tightly superimposed coordinating portions of the two overlapped tiles, the effects of rainproof and heat insulation are achieved. However, in the above-mentioned conventional techniques, each of the tiles is fixed by the other two tiles. If the tile at an end is damaged, the whole row of connected tiles has to be taken apart in order to take out the damaged tile for replacement. Therefore, the preceding techniques need improvements.

SUMMARY OF THE INVENTION

An object of the present invention is to tackle the problems of the preceding techniques mentioned above, that large-sized flat panel workpieces are easily bent, warped and deformed which makes construction more difficult.

In order to achieve the above-mentioned object, a waterproof connecting structure provided by the present invention is used in coordination with a solar panel array in order to construct a vertical wall or a rooftop panel of a building. The solar panel array is defined as a plurality of transverse arrays and a plurality of tandem arrays. The waterproof connecting structure comprises a plurality of transverse array connecting units, and each of the transverse array connecting units comprises two half components and a connecting component. Each of the half components comprises a first wall, a second wall extended from an end of the first wall, a third wall connected to the second wall and disposed parallelly to the first wall, a fourth wall disposed at an end of the third wall away from the second wall and extended toward the first wall, and an orifice disposed between the first wall and the fourth wall. The first wall, the second wall, the third wall and the fourth wall collectively compose a conduit passage. The connecting component comprises a separating element, two extended portions extended from the separating element respectively, and two coupling portions disposed at an end of each of the extended portions respectively. Wherein each of the transverse array connecting units is respectively disposed between two of the adjacent solar panels in transverse arrays. The two half components are disposed between the two solar panels. Each of the first walls is respectively disposed at an outer edge of one of the solar panels. The separating element covers a joint between the two half components. The two extended portions pass through the orifices of the two half components respectively. Each of the coupling portions is connected to the first wall of the two half components. Joints of the separating element and the two solar panels are connected to each of the conduit passages respectively.

The waterproof connecting structure further comprises a plurality of tandem array connecting units. Each of the tandem array connecting units comprises a gripping element and a supporting element. The gripping element comprises a bottom plate, two upright walls respectively extended from two ends of the bottom plate, and two pressing plates respectively connected to the upright walls and extended away from each other. The supporting element comprises a bottom; two supporting portions disposed respectively at two ends opposite to the bottom and having a level difference with the bottom; two drainage portions disposed respectively at another end of each of the supporting portions away from the bottom; and two water blockage portions with a height being the same as that of each of the supporting portions and connected respectively to each of the drainage portions. Wherein each of the tandem array connecting units is disposed between two of the adjacent solar panels in tandem arrays. The two tandem arrays are respectively pressed by each of the pressing plates to lean against each of the supporting portions. The bottom plate is fixedly connected on the bottom. Joints between each of the supporting portions and the two solar panels are connected to each of the drainage portions respectively.

Further, an end of each of the conduit passages is connected to each of the drainage portions.

Further, the first wall has a segmental difference concavely disposed toward the solar panel, and the coupling portion has a barb formed corresponding to the segmental difference.

Further, each of the half components comprises a reinforcing rib connected to the first wall and the third wall.

The transverse array connecting units and the tandem array connecting units of the waterproof connecting structure of the present invention may be taken apart individually, and the single solar panel may be taken off for repair and replacement. Therefore, improvements are achieved for the problem of conventional tile structures that all the connected solar panels have to be removed.

DETAILED DESCRIPTION OF THE PREFERRED EMBODIMENTS

Figure 1:
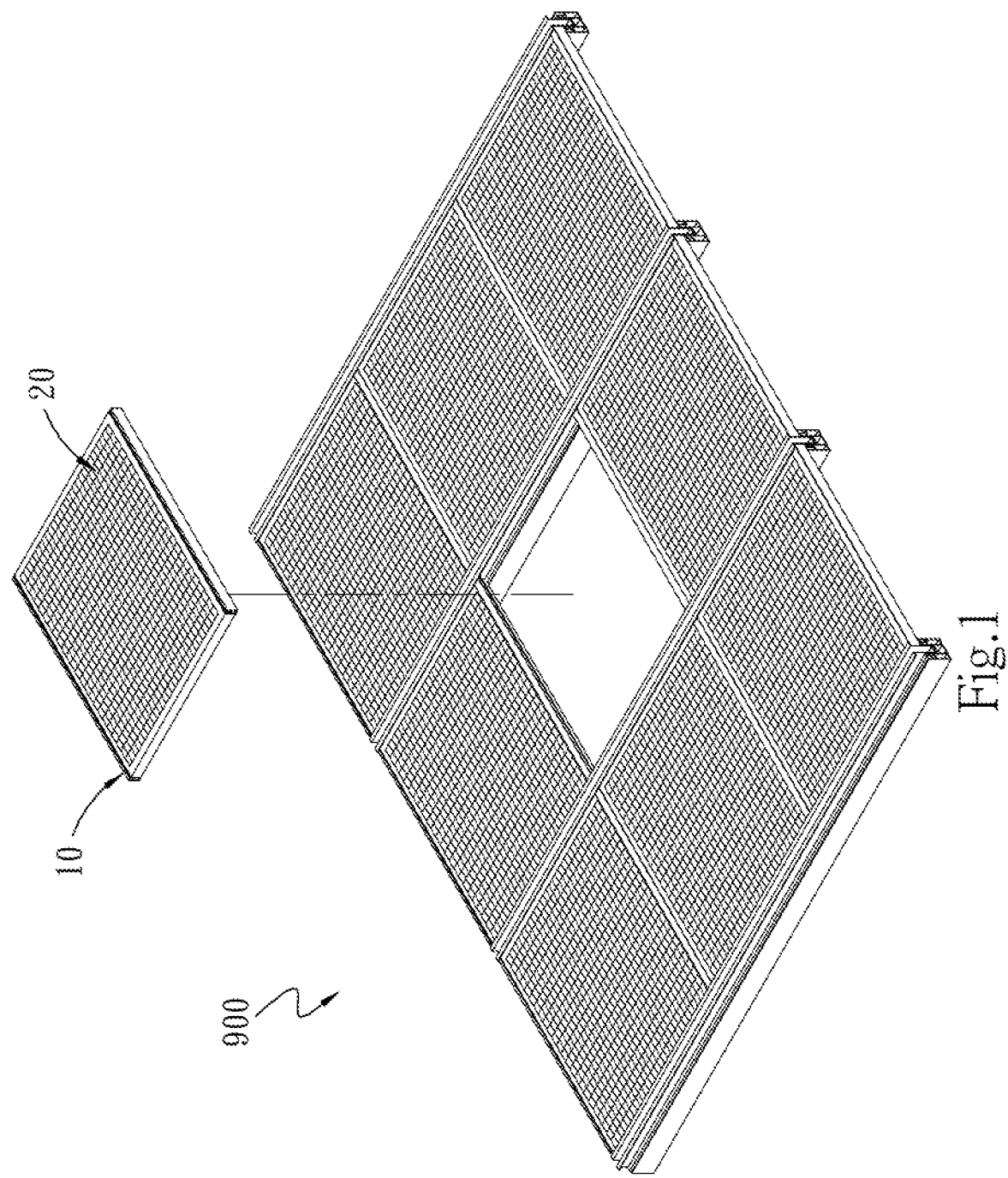
FIG. 1 is a perspective exploded view of a first embodiment in accordance with the present invention.
Figure 2:
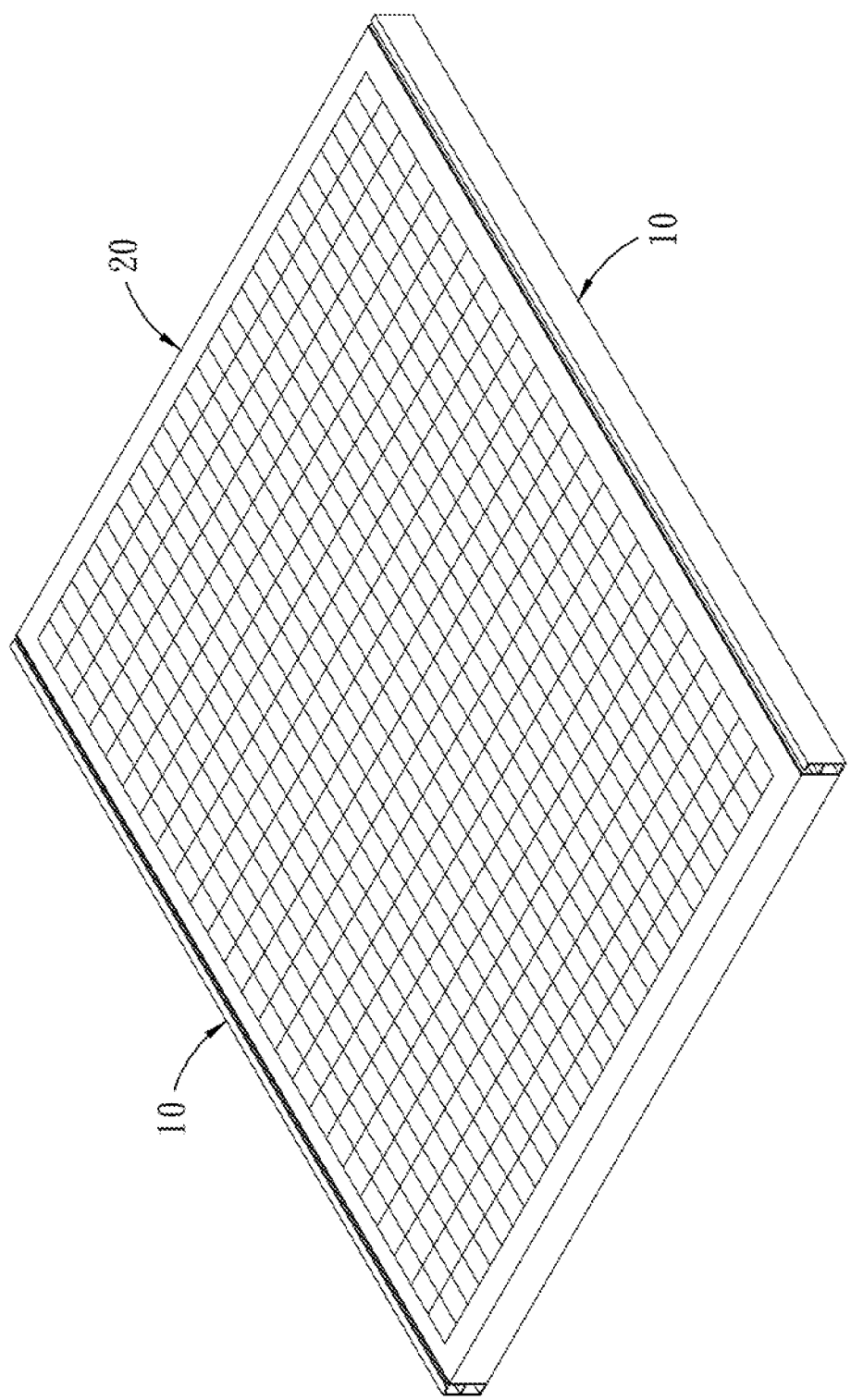
FIG. 2 is a perspective view of a solar panel and half components in accordance with the present invention.
Figure 3:
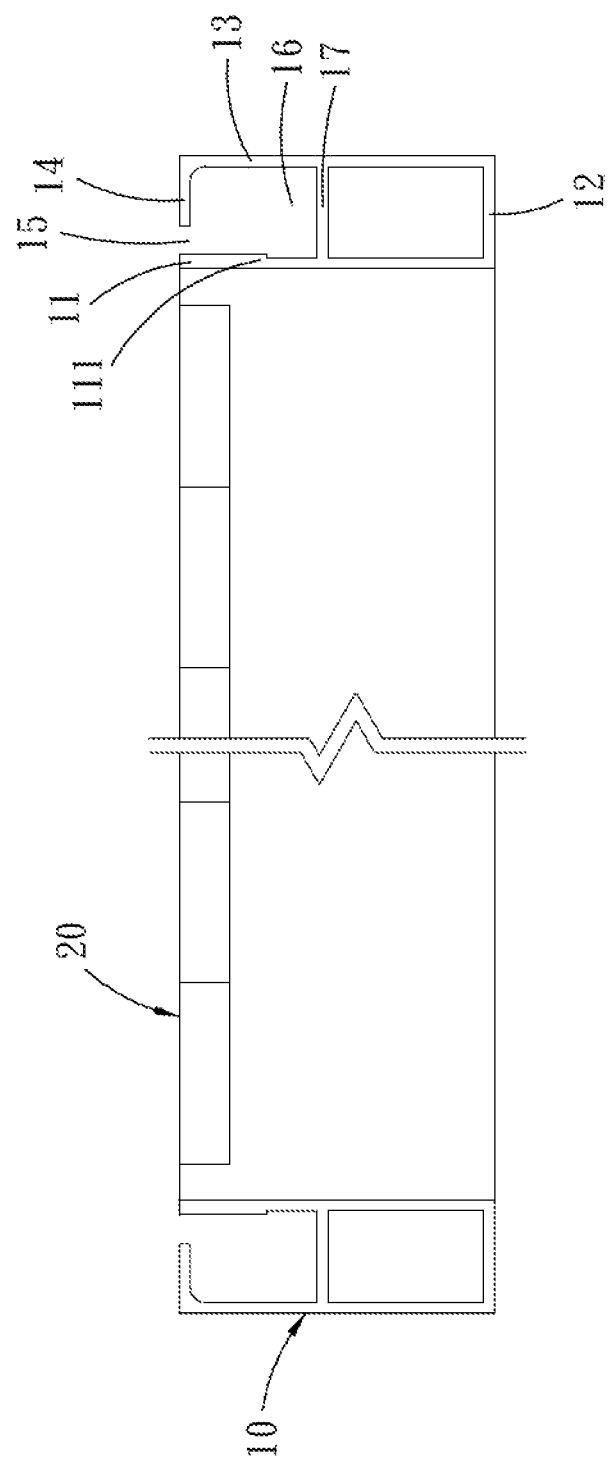
FIG. 3 is a side view of the solar panel and the half components in accordance with the present invention.

Referring to FIGS. 1, 2 and 3 of the present invention, a waterproof connecting structure provided by the present invention is used in coordination with a solar panel array 900 in order to construct a vertical wall or a rooftop panel of a building. The solar panel array 900 comprises a plurality of solar panels 20, the plurality of solar panels 20 are arranged along a plane, and are defined as a plurality of transverse arrays and a plurality of tandem arrays. The waterproof connecting structure comprises a plurality of transverse array connecting units, and each of the plurality of transverse array connecting units is used for connecting two of the adjacent solar panels 20 in the transverse array. Each of the plurality of transverse array connecting units comprises two half components 10 and a connecting component 30.

Specifically, each of the half components 10 comprises a first wall 11, a second wall 12 extended from an end of the first wall 11, a third wall 13 connected to the second wall 12 and disposed parallelly to the first wall 11, a fourth wall 14 disposed at an end of the third wall 13 away from the second wall 12 and extended toward the first wall 11, and an orifice 15 disposed between the first wall 11 and the fourth wall 14. The first wall 11, the second wall 12, the third wall 13 and the fourth wall 14 collectively compose a conduit passage 16. Each of the half components 10 comprises a reinforcing rib 17 connected to the first wall 11 and the third wall 13 for reinforcing the structure of each of the half components 10. In this embodiment, each of the half components 10 is disposed by a side of one of the plurality of solar panels 20, and the other half component 10 is disposed at an opposite side of that solar panel 20. Each of the half components 10 may be coupled with the plurality of solar panels 20 by methods such as welding, and may be a part integrally formed with a frame of each of the plurality of solar panels 20, and is not limited to it.

Figure 4:
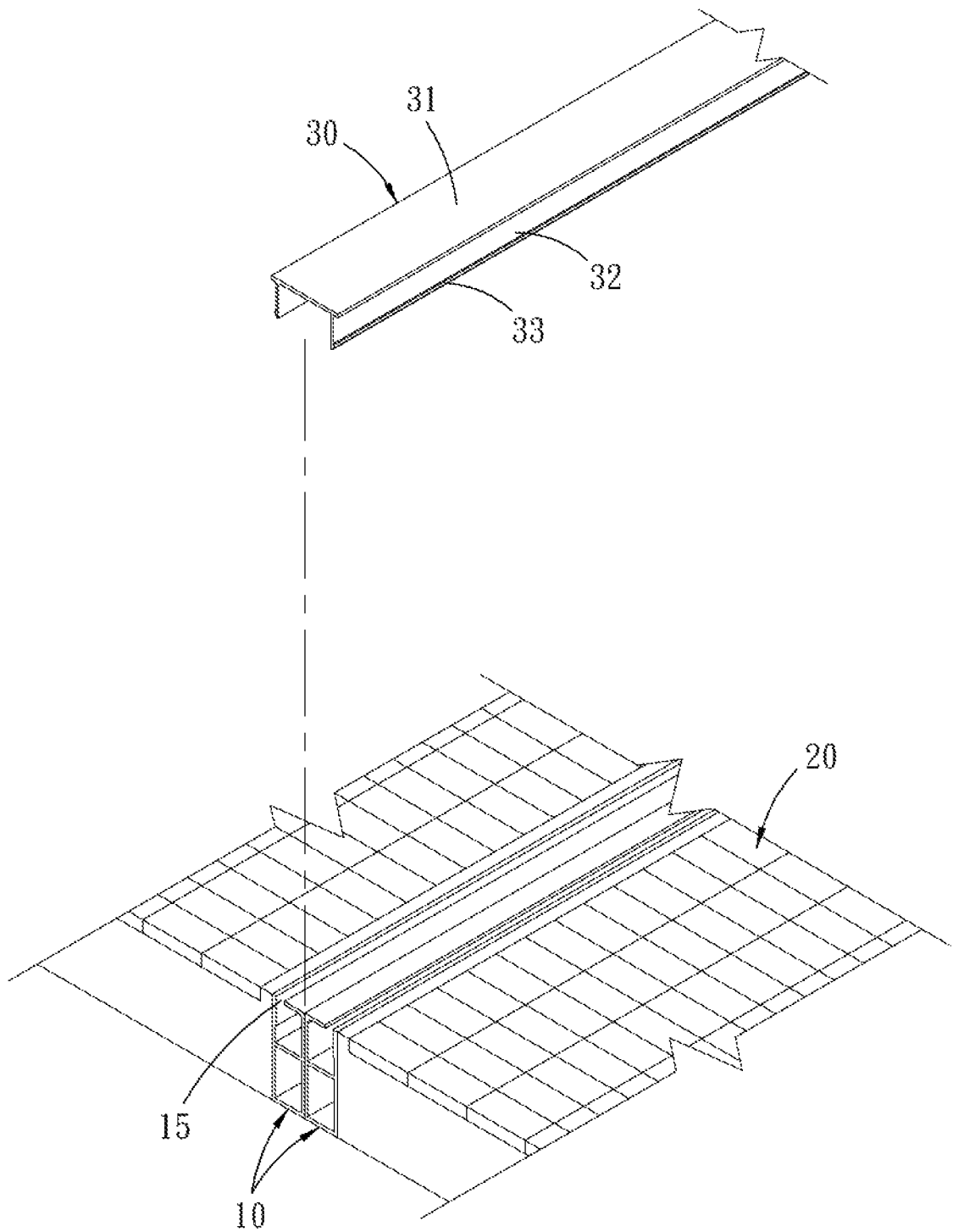
FIG. 4 is a perspective exploded view of the first embodiment in accordance with the present invention.
Figure 5:
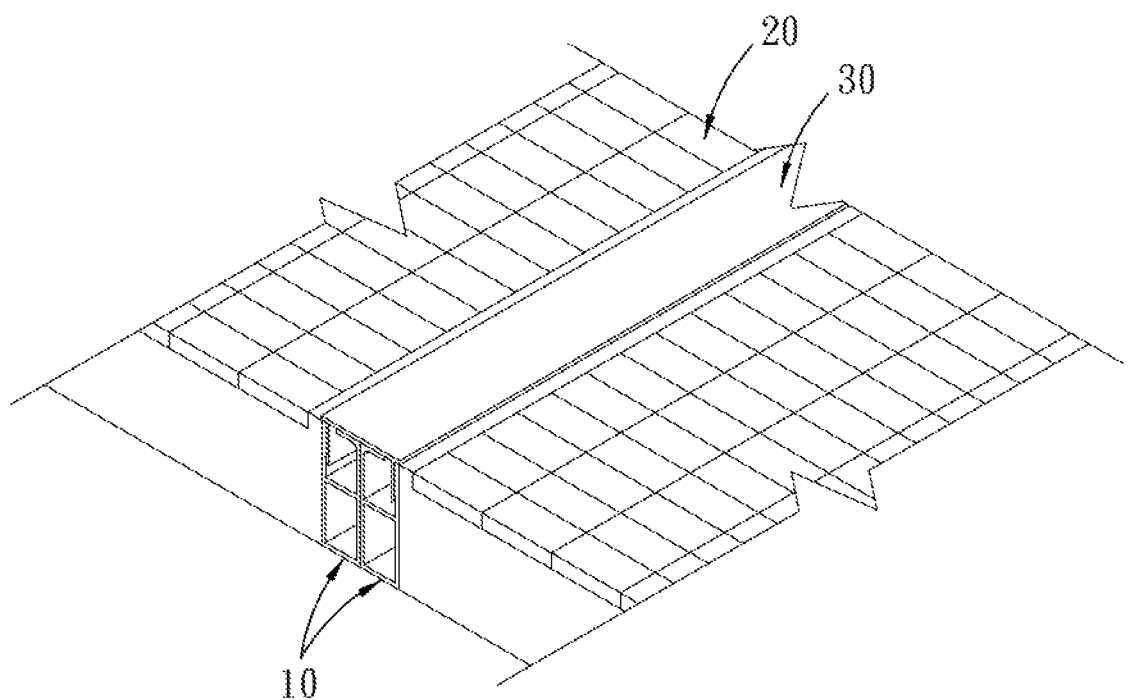
FIG. 5 is a perspective assembly view of the first embodiment in accordance with the present invention.

As shown in FIGS. 3, 4 and 5, the connecting component 30 comprises a separating element 31, two extended portions 32 extended from the separating element 31 respectively, and two coupling portions 33 disposed at an end of each of the extended portions 32 respectively. In this embodiment, the first wall 11 has a segmental difference 111 concavely disposed toward the plurality of solar panels 20, and the coupling portion 33 has a barb formed corresponding to the segmental difference 111 for fastening the coupling portion 33 with the segmental difference 111.

Ways of assembling and functions of the present invention are explained hereinafter. Each of the plurality of transverse array connecting units is respectively disposed between two of the adjacent solar panels 20 in transverse arrays. The two half components 10 are disposed between the two adjacent solar panels 20. Each of the first walls 11 of the two half components 10 is respectively disposed at an outer edge of one of the adjacent solar panels 20. The separating element 31 covers a joint between the two half components 10. The two extended portions 32 pass through the orifices 15 of the two half components 10 respectively. Each of the coupling portions 33 is connected to the first wall 11 of the two half components 10. Joints of the separating element 31 and the two of the adjacent solar panels 20 are respectively connected to each of the conduit passages 16. Thereby, when water is infiltrated into the joints of the separating element 31 and the two of the adjacent solar panels 20, it may be discharged through each of the conduit passages 16.

Figure 6:
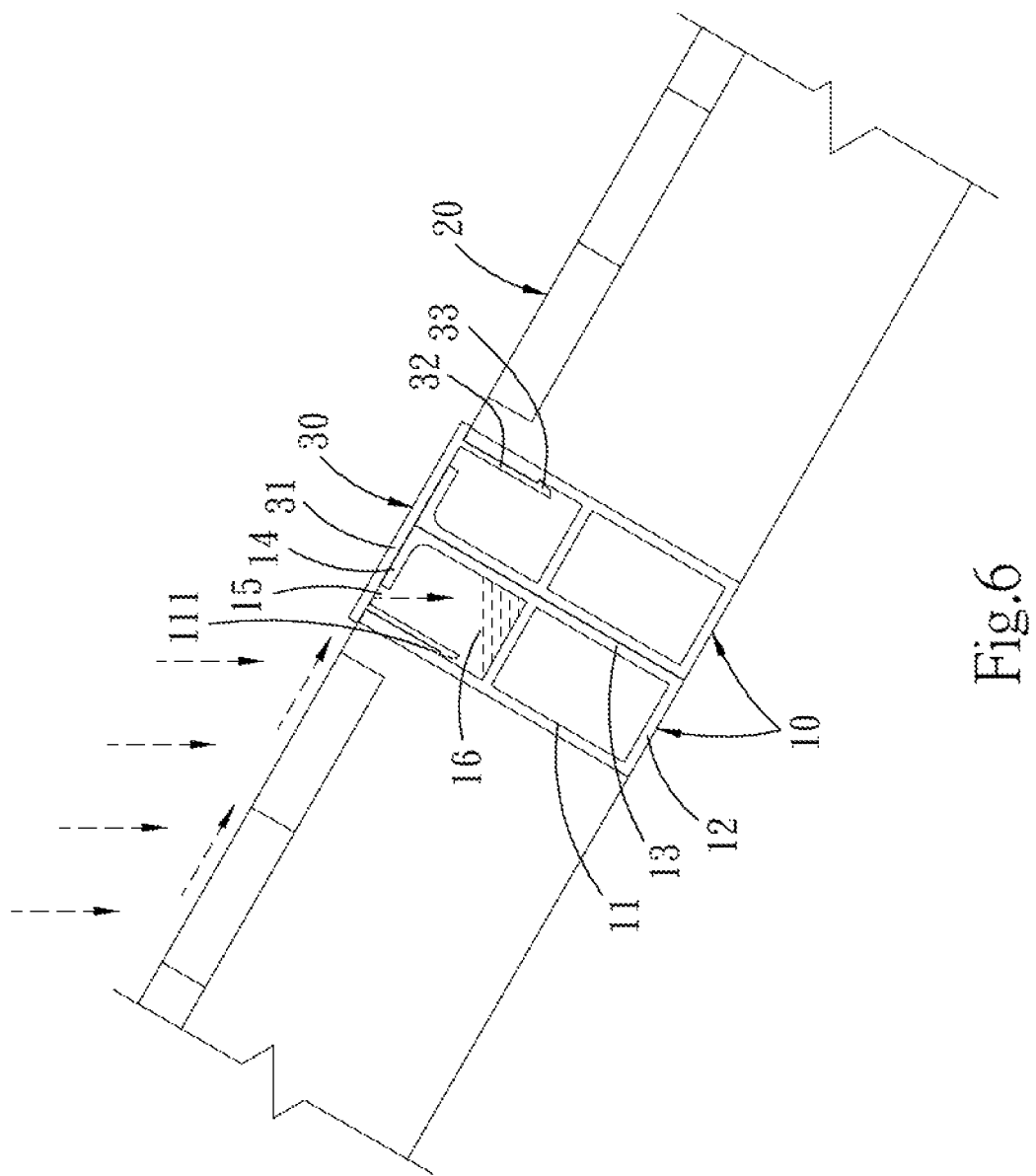
FIG. 6 is a side view of the present invention being embodied as a rooftop panel.
Figure 7:
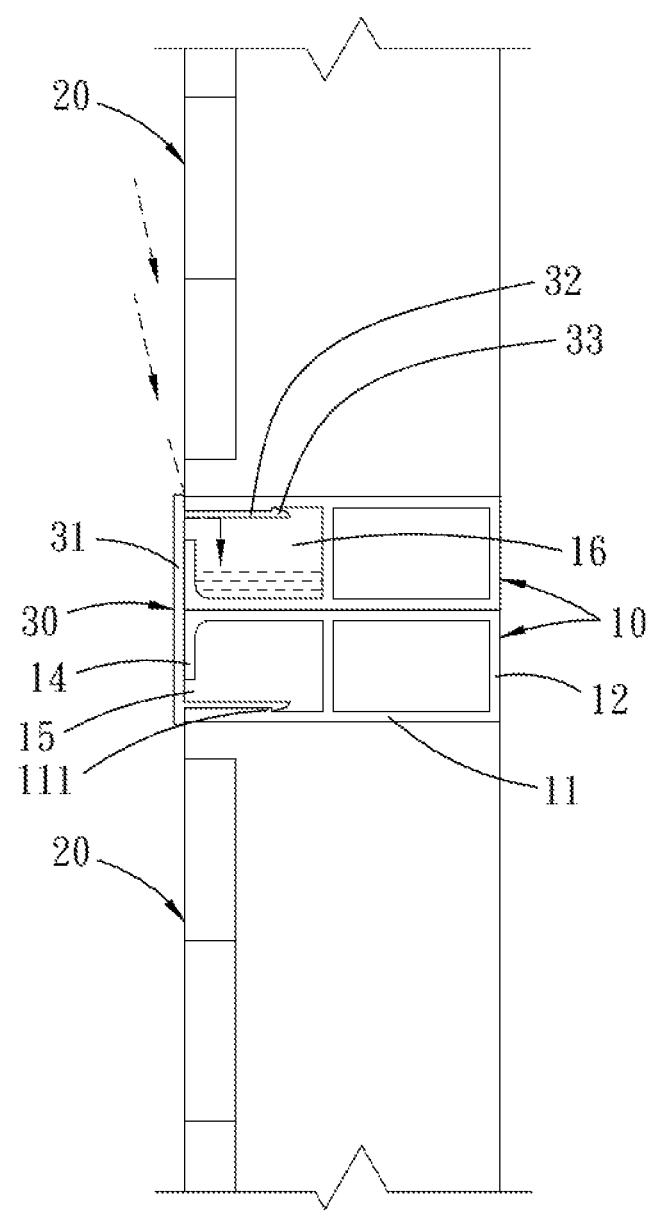
FIG. 7 is a side view of the present invention being embodied as a vertical wall.

Please refer to FIG. 6, which is a side view of the present invention being embodied as a rooftop panel. When it rains, rainwater flows down along the solar panel array 900 at an inclined angle toward a lower level, and it is possible that the rainwater may infiltrate from the joint of the separating element 31 and the two of the adjacent solar panels 20. At this point, the infiltrated rainwater will enter into the conduit passage 16 from the orifice 15 and is discharged from the conduit passage 16 toward two sides instead of infiltrated into the house. Please refer to FIG. 7, which is a side view of the present invention being embodied as a vertical wall. When it rains, the rainwater flows down along the wall surface, and it is possible that the rainwater may infiltrate from the joint of the separating element 31 and the two of the adjacent solar panels 20. At this point, the infiltrated rainwater will enter into the conduit passage 16 from the orifice 15. After it is blocked by the fourth wall 14, it is then discharged from the conduit passage 16 toward two sides instead of infiltrated into the house. Thereby, the effect of waterproof is achieved.

Figure 8:
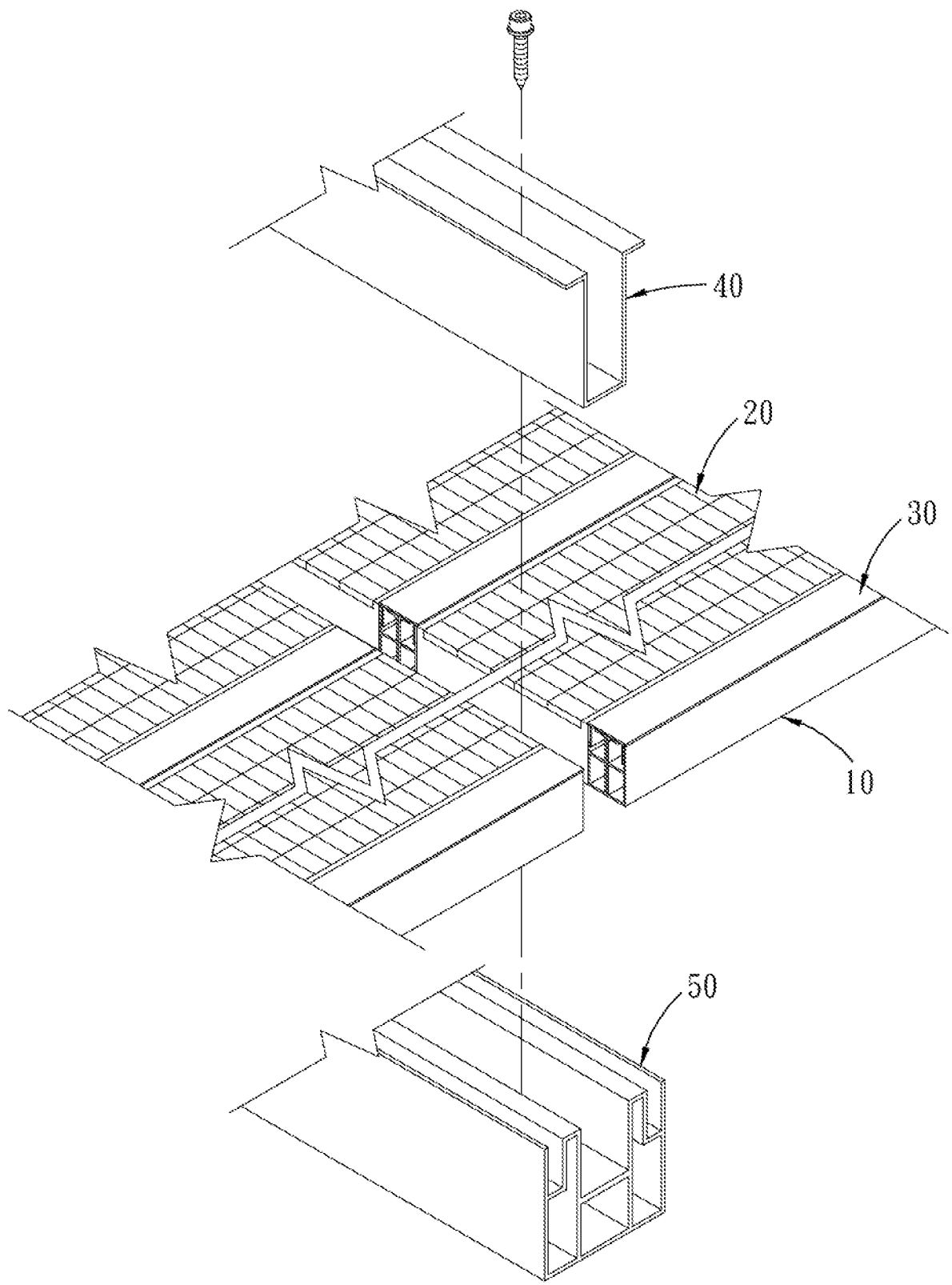
FIG. 8 is a perspective exploded view of a second embodiment in accordance with the present invention.
Figure 9:
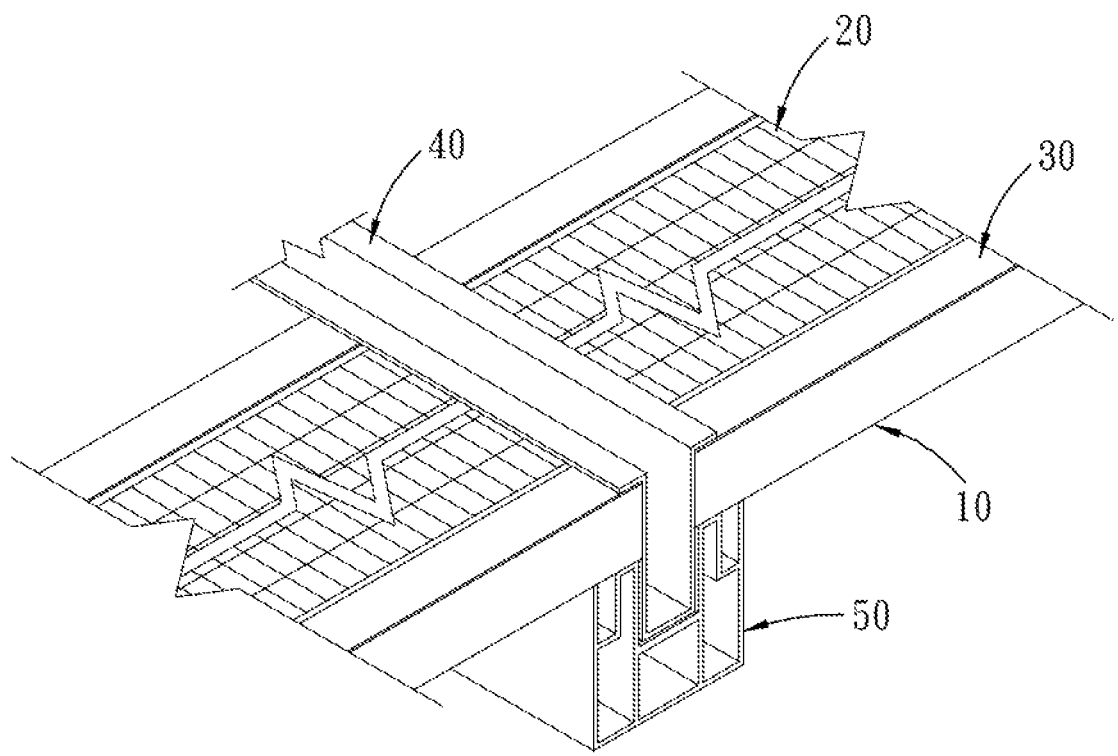
FIG. 9 is a perspective assembly view of the second embodiment in accordance with the present invention.
Figure 10:
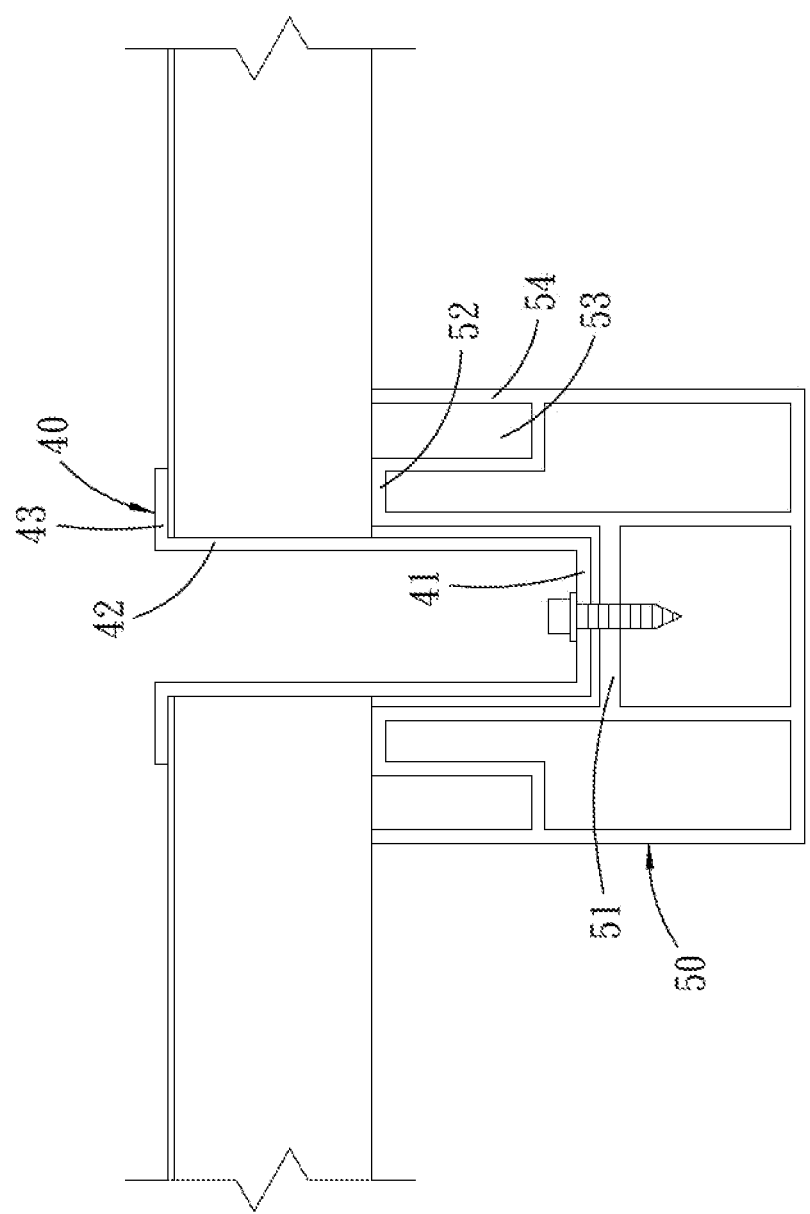
FIG. 10 is a side view of the second embodiment in accordance with the present invention.

Referring to FIGS. 8, 9 and 10, the waterproof connecting structure further comprises a plurality of tandem array connecting units, and each of the plurality of tandem array connecting units comprises a gripping element 40 and a supporting element 50. Each of the plurality of tandem array connecting units is used for connecting two of the adjacent solar panels 20 in the tandem array.

Specifically, the gripping element 40 comprises a bottom plate 41, two upright walls 42 respectively extended from two ends of the bottom plate 41, and two pressing plates 43 respectively connected to the upright walls 42 and extended away from each other. The supporting element 50 comprises a bottom 51; two supporting portions 52 disposed respectively at two ends opposite to the bottom 51 and having a level difference with the bottom 51; two drainage portions 53 disposed respectively at another end of each of the supporting portions 52 away from the bottom 51; and two water blockage portions 54 with a height being the same as that of each of the supporting portions 52 and respectively connected to each of the drainage portions 53.

Wherein each of the plurality of tandem array connecting units is respectively disposed between two of the adjacent solar panels 20 in tandem arrays. The two tandem array connecting units are respectively pressed by each of the pressing plates 43 to lean against each of the supporting portions 52. The bottom plate 41 is fixedly connected on the bottom 51. Joints between each of the supporting portions 52 and the two of the adjacent solar panels 20 are connected to each of the drainage portions 53 respectively. When the present invention is applied as a rooftop panel, each of the tandem array connecting units is preferably disposed along a rooftop obliquely; so that after the solar panel array 900, each of the transverse array connecting units and each of the tandem array connecting units are assembled, each of the drainage portions 53 may be obliquely disposed toward the eave direction and thereby the accumulated water may be discharged. An end of each of the conduit passages 16 is connected to each of the drainage portions 53 in order to achieve the purposes of converging and discharging.

What is claimed is:

1. A waterproof connecting structure used in coordination with a solar panel array in order to construct a vertical wall or a rooftop panel of a building, the solar panel array being defined as a plurality of transverse arrays and a plurality of tandem arrays, the waterproof connecting structure comprising:
    a plurality of transverse array connecting units, each of the transverse array connecting units respectively disposed between two adjacent solar panels in transverse arrays, and each of the transverse array connecting units comprising:
    two half components, each of the half components comprising a first wall, a second wall extended from an end of the first wall, a third wall connected to the second wall and disposed parallel to the first wall, a fourth wall disposed at an end of the third wall away from the second wall and extended toward the first wall, a reinforcing rib connected to the first wall and the third wall, and an orifice disposed between the first wall and the fourth wall; the first wall, the second wall, the third wall and the fourth wall collectively composing a conduit passage; and
    a connecting component, the connecting component comprising a separating element, two extended portions extended from the separating element respectively, and two coupling portions disposed at an end of each of the extended portions respectively;
    wherein the two half components are disposed between the two solar panels, each of the first walls is respectively disposed at an outer edge of one of the solar panels, the separating element covers a joint between the two half components, the two extended portions pass through the orifices of the two half components respectively, each of the coupling portions is connected to the first wall of the two half components, joints of the separating element and the two solar panels are connected to each of the conduit passages respectively.

2. The waterproof connecting structure according to claim 1, further comprising a plurality of tandem array connecting units, each of the tandem array connecting units comprising:
    a gripping element comprising a bottom plate, two upright walls respectively extended from two ends of the bottom plate, and two pressing plates respectively connected to the upright walls and extended away from each other; and
    a supporting element comprising a bottom; two supporting portions disposed respectively at two ends opposite to the bottom and having a level difference with the bottom; two drainage portions disposed respectively at another end of each of the supporting portions away from the bottom; and two water blockage portions with a height being the same as that of each of the supporting portions and connected respectively to each of the drainage portions;
    wherein each of the tandem array connecting units is disposed between two of the adjacent solar panels in tandem arrays, the two tandem arrays are respectively pressed by each of the pressing plates to lean against each of the supporting portions, the bottom plate is fixedly connected on the bottom, joints between each of the supporting portions and the two solar panels are connected to each of the drainage portions respectively.

3. The waterproof connecting structure according to claim 2, wherein an end of each of the conduit passages is connected to each of the drainage portions.

4. The waterproof connecting structure according to claim 1, wherein the first wall has a segmental difference concavely disposed toward the solar panel, and the coupling portion has a barb formed corresponding to the segmental difference.

* * * * *